Aug. 25, 1964 R. W. GRAHAM ETAL 3,146,048

CABINET FOR ELECTRONIC EQUIPMENT

Filed July 27, 1962 4 Sheets-Sheet 1

INVENTORS
ROGER W. GRAHAM
ALLAN D. LESSER

BY Spencer E. Olson

ATTORNEY

Aug. 25, 1964 R. W. GRAHAM ETAL 3,146,048

CABINET FOR ELECTRONIC EQUIPMENT

Filed July 27, 1962 4 Sheets-Sheet 2

INVENTORS
ROGER W. GRAHAM
ALLAN D. LESSER

BY Spencer E. Olson
ATTORNEY

CABINET FOR ELECTRONIC EQUIPMENT

Filed July 27, 1962 4 Sheets-Sheet 3

INVENTORS
ROGER W. GRAHAM
ALLAN D. LESSER
BY
Spencer E. Olson
ATTORNEY

CABINET FOR ELECTRONIC EQUIPMENT

Filed July 27, 1962 4 Sheets-Sheet 4

INVENTORS
ROGER W. GRAHAM
ALLAN D. LESSER
BY
Spencer E. Olson
ATTORNEY 3,146,048

CABINET FOR ELECTRONIC EQUIPMENT

Roger W. Graham, Williamsville, and Allan D. Lesser, Depew, N.Y., assignors to Sylvania Electric Products Inc., a corporation of Delaware Filed July 27, 1962, Ser. No. 212,949

8 Claims. (312—323)

The present invention relates generally to cabinets for electronic or other equipment of the type which includes a slide mechanism for supporting a chassis or drawer for movement from a normal position within an enclosure and a fully extended position, and more particularly to a detent mechanism for indexing the extended chassis to various tilted positions for convenient inspection and repair.

It has for some time been standard practice to install equipment, such as radio chassis, on track-like structures secured to the walls of a cabinet that permit withdrawal of the chassis from the housing structure while still offering support for the weight of the chassis. It has also become generally accepted practice to provide means on the extendable track or slide that will permit rotation or tilting of the chassis to several positions when in the extracted position to facilitate service and maintenance of the equipment. However, the mechanisms heretofore available for providing the necessary tilting functions have a number of disadvantages which have limited their usefulness. In general, in the prior art mechanisms the chassis is supported on opposite sides by a pair of pivotal mounts on respective track assemblies secured to the sidewalls of the cabinet, and some form of detent mechanism for releasably securing the chassis in a selected one of several tilted positions. In most of the prior art mechanisms of which applicants are aware, the detent mechanism is unlocked by the application of force to a button projecting from the front panel of the chassis. Desirably, the detent mechanism is releasable by application of a light "thumb" force, to leave the rest of the hand of the operator free to exert rotational movement to the chassis. Frequently, however, because of undesirable friction and/or binding of the indexing mechanism, more force is required to unlock the detent than can be comfortably exerted by the thumb alone. This causes a tendency for the operator to use his whole hand for applying the necessary force to unlock the detent, sometimes resulting in rotation of the chassis to undesired positions and creating a hazard to the operator.

In other known detent mechanisms, the unlocking means are not provided on the front panel, but rather are in inaccessible locations inside the chassis, usually in a position where they are very awkward to operate. These mechanisms, likewise, have also suffered from excessive friction and binding, and generally require at least one of the operator's hands to unlock the detent, leaving but one hand for steadying the chassis during rotation between detent positions.

Moreover, in available mechanisms of this type, the means for attaching the chassis to the extendable slides have either allowed excessive "slop" or play in the attachment, or were so securely fastened that considerable effort was required to engage and disengage the chassis from the slides. More often than not, the final step in detaching the chassis from its slides was sudden, presenting the hazard of the chassis falling and causing injury to the equipment and/or the operator.

With an appreciation of the shortcomings of available mechanisms of this type, applicants have as a primary object of their invention to provide an improved locking and releasing mechanism for tilting an electronic chassis to a plurality of indexed positions on extended supporting slides.

Another object of the invention is to provide a detent mechanism, operable from the front panel of the chassis, which is releasable with a minimum of force.

Another object of the invention is to provide a detent mechanism in which the pushbutton and the actuating linkage for the detent is not connected to the portion of the indexing mechanism that supports the weight and unbalance forces of the chassis, thereby eliminating excess binding and friction.

Another object of the invention is to provide a detent mechanism, the actuation of which may be interlocked with the means normally provided for locking the slides in their extended position to preclude inadvertent actuation of the slide locking mechanism during rotation of the chassis, which otherwise might cause damage to the locking mechanism.

Still another object of the invention is to provide a detent mechanism particularly suitable for use with non-extending type slides; that is, slides that do not extend beyond the chassis when it is rotated to vertical positions.

A still further object of this invention is the provision of an improved arrangement for attaching the chassis to the extendable slides that allows rapid, easy, and safe detachment of the chassis from the slide.

Briefly, the chassis is supported near its center of gravity by two pivotal mounts on a pair of extendable slides. To one or both sides of the chassis is secured a notched circular plate, the plate being concentric with the pivot mounts and the notches determining the positions of tilt to which the chassis may be indexed. Detenting action is accomplished by a spring-loaded cam-follower which engages the notches in the plate and includes a linkage for locking the follower in a selected notch. The detent is released by releasing the linkage to allow the cam-follower to disengage itself from the notch as the chassis is tilted to a new position. The front-panel pushbutton and the linkage to the cam-follower is arranged so as to not have to overcome forces caused by the weight of unbalance of the chassis in any particular tilted position. The chassis is attached to the slides by a pair of close-fitting dovetail structures which are secured in engaged relationship by a pair of captive screws that are readily loosened to permit the removal of the chassis from the slide by lifting the chassis straight up to disengage the mating dove-tails. Even when the screws are loosened, the weight of the chassis is supported on the dovetail arrangement so as to minimize the risk of the chassis being dropped.

Other objects, features, and advantages of the invention, and a better understanding of its construction and operation will become apparent from the following description taken in conjunction with the accompanying drawings, in which.

Figure 1:
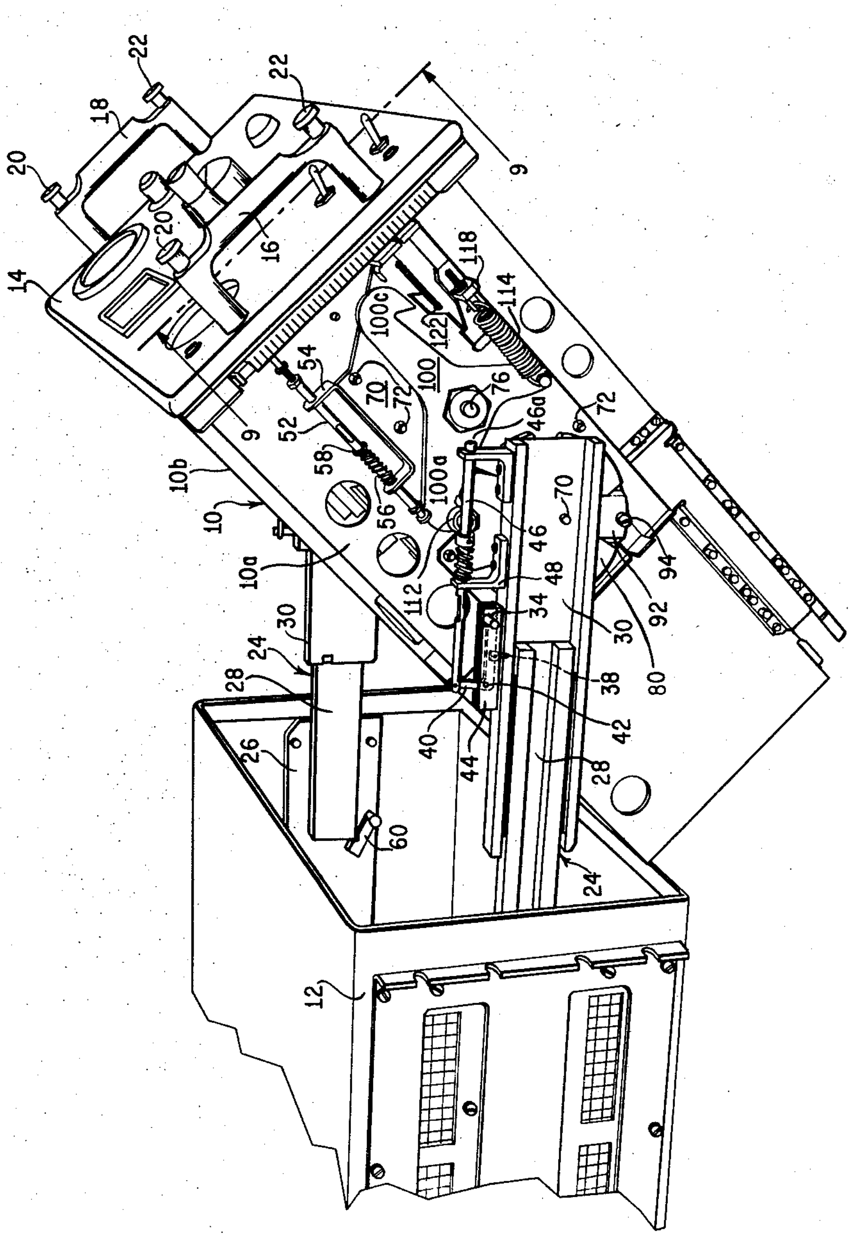
FIG. 1 is a perspective view of a cabinet installation of electronic apparatus embodying the invention.

Referring now to the drawings, in which like reference numerals refer to similar parts throughout, FIG. 1 illustrates the invention embodied in an assembly of an electronic chassis 10 and a horizontally elongated cabinet 12, open at one end for receiving and enclosing the chassis when in its retracted position. The chassis 10 may comprise any type of equipment requiring installation in a cabinet, as for shielding or environmental protection, and accessibility for maintenance and repair. The nature of the equipment is immaterial to the present invention, and suffice it to say that the chassis has a front panel 14 which engages the open end of the cabinet 12 when the chassis is in retracted position, and on which are mounted a pair of handles 16 and 18 to facilitate withdrawal and rotation of the chassis. Incorporated within each of the handles is a slide lock releasing button 20 and a detent release button 22, the operation of which will be described in greater detail hereinafter. The chassis is of conventional construction, including relatively rigid sidewalls 10*a* and 10*b* to which connection is made for supporting the chassis relative to the cabinet. The chassis 10 is mounted on the cabinet 12 for movement between a normal position within the cabinet and a wholly extended position in which the chassis can be tilted to various angular positions (one of which is illustrated) for inspection and repair of the components of the chassis.

Figure 2:
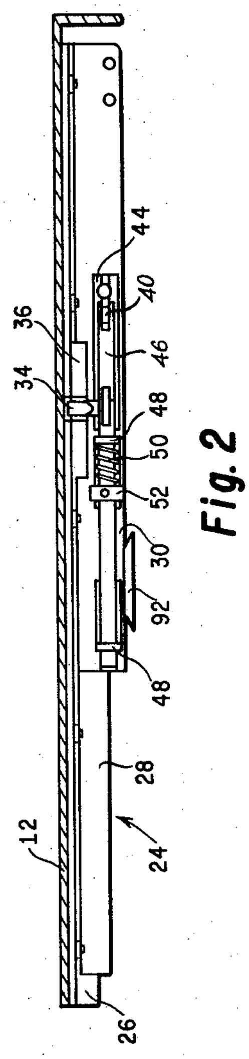
FIG. 2 is a plan view of one of the slides on which the chassis is supported.
Figure 3:
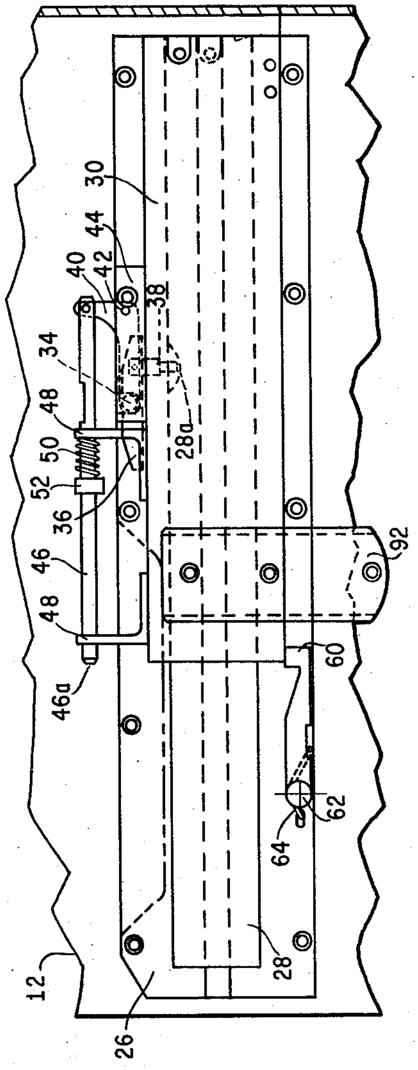
FIG. 3 is an elevation view of the slide of FIG. 2.
Figure 4:
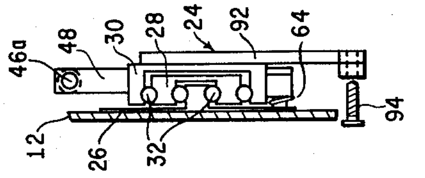
FIG. 4 is an end view of FIG. 3.

Translatory support for the chassis 10 is provided by two telescopic track or rail assemblies 24 of known construction mounted horizontally on the opposite sidewalls of the cabinet 12. As best seen in FIGS. 2, 3 and 4, each assembly 24 comprises three telescopic track members including a stationary track 26 secured to the inner surface of an adjacent wall of the cabinet 12, an intermediate member 28 slidably supported on the stationary member, and an outside member 30 slidably supported on the intermediate member for extension beyond the stationary and intermediate members. As viewed in FIGS. 2 and 3, the intermediate 28 and outside slide 30 would telescopically extend to the left from the open end of cabinet 12. Antifriction rollers or bearings 32 are disposed in load-supporting relation between the co-acting track members 26, 28 and 30.

When the slide is in full closed locked position, as shown in FIGS. 2 and 3, slide member 30 (to which the chassis 10 is mounted) is locked to the stationary member 26 by locking pin 34 projecting from member 30 which engages a notch in a locking block 36 secured to member 26. The intermediate track 28 has a notch 28*a* formed in its upper edge which provides clearance for slide locking pin 38 when locking pin 34 engages the slot in block 36. Pins 34 and 38 are lifted from their respective notches by a common bell crank 40 to which both pins are secured, the bell crank being pivoted at 42 in a block 44 and arranged to lift the pins upon movement of the rod 46 to the right in FIG. 3. Rod 46 is supported in a bracket 48 secured to slide member 30, a spring 50 compressed between one end of the bracket and a nut 52 on the rod normally urging the shaft to the left tending to keep the locking pins 34 and 38 in engagement with their respective notches.

To unlock the slide for withdrawal from the cabinet, the rod 46 is moved to the right (in FIG. 3) by application to the free end 46*a* thereof of a force sufficient to overcome the force of spring 50. This force is transmitted through the button 20 in handle 16 through an extender rod 52 mounted on the sidewall of the chassis cabinet. In the position of the chassis illustrated in FIG. 1, the inner end of rod 52 is swung away from the end of rod 46, but when the chassis is horizontal rods 52 and 46 are collinearly aligned. The extender rod 52 is also supported in a U-shaped bracket 54 and is urged toward the front panel by a spring 56 kept in compression by a nut 58 on the rod.

Inward movement of rods 52 and 46 causes the bell crank 40 to lift locking pins 34 and 38 from their respective notches, thereby unlocking slide member 30 from member 26.

When the two moveable sections of the slide assembly are fully extended, member 30 is prevented from moving in with respect to the intermediate slide member 28 by slide locking pin 38 which, due to the pressure of spring 50, drops down in front of intermediate slide member 28. The intermediate member is locked with respect to stationary member 26 by a locking arm 60 pivotally mounted at 62 to stationary slide member 26 and urged upwardly by spring 64. The spring causes the arm to snap up and engage the right end (FIG. 3) of member 28 when the latter is fully extended. Suitable stops, not shown, on the various members limit further outward movement of each member relative to its supporting track member.

To unlock the slide for reinsertion of the chassis, button 20 is again pushed in to rock bell crank 40 which lifts locking pin 38 out of engagement with the front end of intermediate slide member 28. As the chassis is pushed in, slide member 30 rides onto locking arm 60 thereby unlocking the intermediate member. When the drawer is pushed in far enough for pins 34 and 38 to engage their respective notches, they are again locked in position by the pressure of spring 50.

Figure 5:
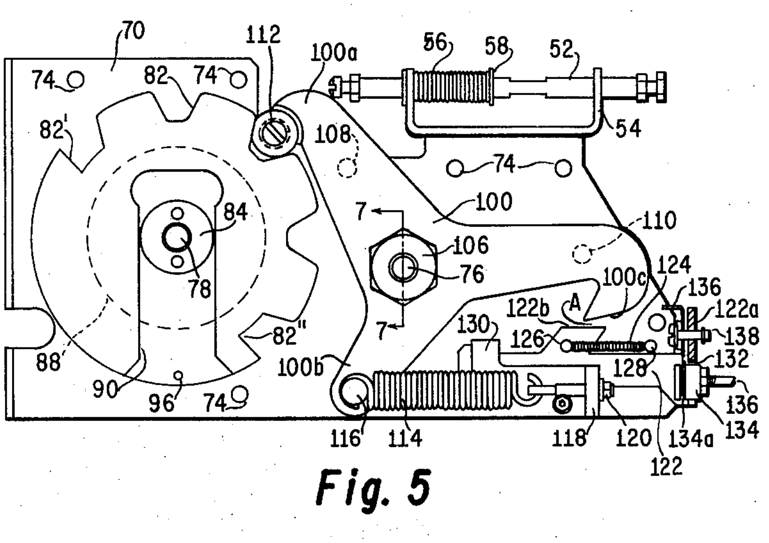
FIG. 5 is an elevation view of the detent mechanism according to the invention.
Figure 6:
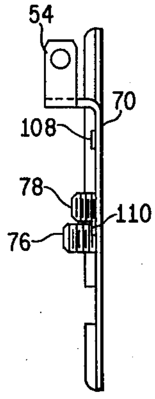
FIG. 6 is a right end view of the mounting plate for the assembly of FIG. 5, with the mechanism removed.
Figure 8:
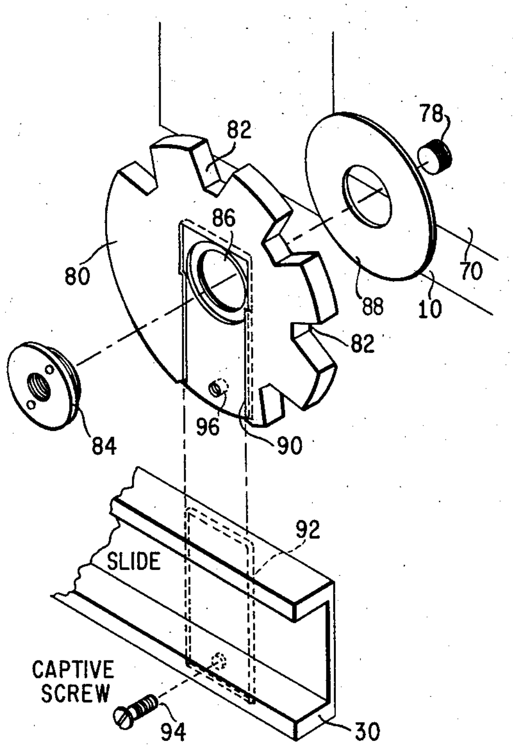
FIG. 8 is an exploded perspective view illustrating the manner in which the detent mechanism is attached to the slide.

The chassis 10 is supported near its center of gravity by two pivotal mounts secured to opposite sidewalls of the chassis and engaging a respective track assembly 24 near the outer end of slide member 30. The nature of the pivotal mounts and the attachment of the chassis to the slide members 30 are best illustrated in FIGS. 5 and 8. Referring first to FIG. 5, the pivotal mount and associated detent mechanism are assembled on a mounting plate 70 which, in turn, is secured to the sidewalls of the chassis by bolts 72 (shown in FIG. 1) inserted through holes 74 in the plate. The previously referred to bracket 54 for supporting the slide release rod 52 is integral with the plate 70, extending perpendicularly from the plane of plate 70 as viewed in FIG. 5. As shown in FIG. 6, which is a view from the right end of plate 70 without the mechanism assembled thereon, a pair of threaded studs 76 and 78 pressed into openings in the plate 70 respectively serve as the pivot for the detent cam follower (to be described) and the shaft or trunnion on which the chassis is rotated relative to the slide members. As best seen in FIG. 8, a detent block 80, a circular plate formed with a plurality of notches 82 distributed about a portion of its circumference, is mounted on stud 78 by a threaded nut 84 which fits into a shouldered opening 86 at the center of the plate and engages the threads on stud 78. The detent block is spaced from the mounting plate 70 by a shim 88, and the nut 84 is tightened to a degree which allows pivotal movement of block 80 relative to stud 78. The notches 82 are of modified V-shape, the angle between the sides of which may be of the order of 60 degrees for reasons which will later be apparent. Notches 82′ and 82″ at either end of the series each have only one side inclined outwardly relative to a radius passing through the apex of the notch, the other side of these notches being inclined slightly inward.

The surface of detent block 80 remote from the mounting plate is formed with a dovetail slot 90 of a width slightly greater than the diameter of opening 86 and of a length somewhat greater than the radius of block 80. The slot is oriented in a perpendicular direction when mounting plate 70 (and the chassis) are horizontal. The slot 90 mates with a dovetail plate 92 secured to the inner surface (in FIG. 1) of slide member 30. By the mating of plate 92 in slot 90, the detent block is removably secured near the end of slide rail 30, the nut 84 being covered by plate 92 when the latter is engaged by the slot. Inadvertent disengagement of the chassis 10 from the slides is prevented by a screw 94 extending through plate 92 and engaging a threaded opening 96 in the detent block.

Thus, the detent block is rigidly secured to the slide, with relative rotation between the chassis and the slide afforded by stud 78. However, since the detent block is secured to the chassis, removal of screw 94 allows the chassis to be lifted straight up to disengage the dovetail connection and permit easy removal of the chassis 10 from the slides.

Figure 7:
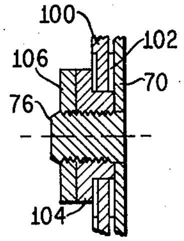
FIG. 7 is an enlarged cross-section taken along line 7—7 of FIG. 5.

Cooperating with the detent block to lock the chassis 10 in a selected tilted position is a three-armed crank 100 pivotally mounted on stud 76, which, as was mentioned earlier, is press-fit into mounting plate 70. As shown in the cross-section view of FIG. 7, the arm 100 is spaced from mounting plate 70 by a shim 102, and is supported for rotation on a threaded bushing 104 secured to stud 76 by a lock nut 106. As will be seen, arm 100 rocks through only a small angle. To minimize friction and maintain parallelism between arm 100 and mounting plate 70, a pair of nylon rub buttons 108 and 110 project from plate 70 and engage the inner surface of crank arm 100. At the extremity of arm 100*a* of the crank is secured a small roller bearing 112 of a diameter so related to the width of the notches in the cam block as to drop approximately halfway into the notch as shown. The notches are curved at their outer edges to permit the roller bearing to ride in and out of them smoothly. By reason of the inclined sides of the notches, the bearing 112 engages the notch at essentially two point contacts.

The cam follower 112 is urged into engagement with the detent block by a spring 114, fastened at one end to a stud 116 projecting from the end 100*b* of crank 100 and anchored at the other end to a hook extending through a bracket 118 secured to mounting plate 70, which imparts a counter-clockwise torque (as viewed in FIG. 5) to the detent follower. A threaded nut 120 on the hook permits adjustment of the tension of the spring, which may be such as to apply about 30 pounds force on stud 116. This torque on the detent follower forces the roller 112 into the notch 82, the vector distribution of the radial force exerted by the roller at the points of contact with the sides of the notch preventing relative rotation between the chassis 10 and the detent block. Since the detent block is secured against rotation relative to the slide member, the chassis cannot rotate relative to the slide when the cam follower 112 is engaged with a notch.

The force of spring 114 is sufficient to hold the detent follower firmly in place in the detent block when no rotational forces are applied to the chassis other than its own overturning moment due to the displacement of the center of gravity of the chassis from the point about which it pivots. To prevent inadvertent tipping of the chassis by the accidental application of rotational forces to the chassis, the crank arm 100 is locked against rotation by a detent latch bar 122 supported on plate 70 for sliding movement directly beneath the end 100*c* of the crank arm. The latch bar is normally urged to the right (in FIG. 5) by a light spring 124 connected at one end to a stud 126 projecting perpendicularly outward from the latch bar and anchored at the other end on a stud 128 secured to and projecting from the mounting plate 70. The latch bar is constrained to slide parallel to mounting plate 70 by a bracket 130 mounted parallel to the mounting plate and spaced therefrom a distance slightly greater than the thickness of latch bar 122. When the latch bar is in the position shown, a small gap exists at A between the upper edge 122*b* of the latch bar and the end 100*c* of the crank arm. That is, normally there is no direct contact between the latch bar and the load-supporting crank arm whereby the latch bar may be moved to the left by application of only the force necessary to overcome the tension of spring 124. This spring need only exert sufficient force to return the small latch bar to its normal position, a force easily overcome by "thumb pressure" of an operator. Should an accidental load be placed on the chassis sufficient to overcome the anti-rotational force exerted by spring 114, the gap at A closes and prevents the detent follower 112 from camming out of the notch in the detent block.

Figure 5A:
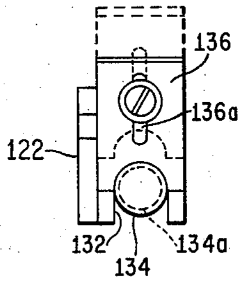
FIG. 5A is an enlarged fragmentary elevation view of a portion of the assembly of FIG. 5.

The latch bar is released by the push-button 22 mounted in the handle 16 (or 18) on the front panel. To facilitate connection of the button to the latch bar, the latter at its right end is bent at right angles to the plane of its sliding portion to provide an extension 122*a* which projects outwardly therefrom. This extension, shown in cross-section in FIG. 5 and in elevation in FIG. 5A, has a semi-circular opening 132 at the lower edge thereof for receiving a cylindrical head 134 threaded to the end of the shaft 136 which, in turn, is secured to the button 22. Near its inner end, head 134 is provided with a circumferential groove 134*a*. The head 134 is detachably secured to extension 122*a* by a latch 136 having an elongated opening 136*a* therein (FIG. 5*a*) to allow it to be moved up and down with respect to a locking screw 138 secured to extension 122*a*. The latch is bifurcated at the lower end and dimensioned to engage the groove 134*a* when in the "down" position, and to allow the head to be removed from opening 132 when in the "up" position (shown in dotted lines in FIG. 5A). The described disconnect provides rapid and convenient separation of shaft 136 from the latch bar to allow front panel 14 to be tilted with respect to the chassis, a feature of many equipments of the type here under consideration. Also, this type of connection does not transmit to the latch bar any rotational motion of button shaft 136 which may occur through inadvertence or otherwise. That is, binding of latch bar 122 in its guide which might otherwise occur upon rotation of shaft 136 is eliminated by the "no-torque" connection.

Figures 10, 11, 12:
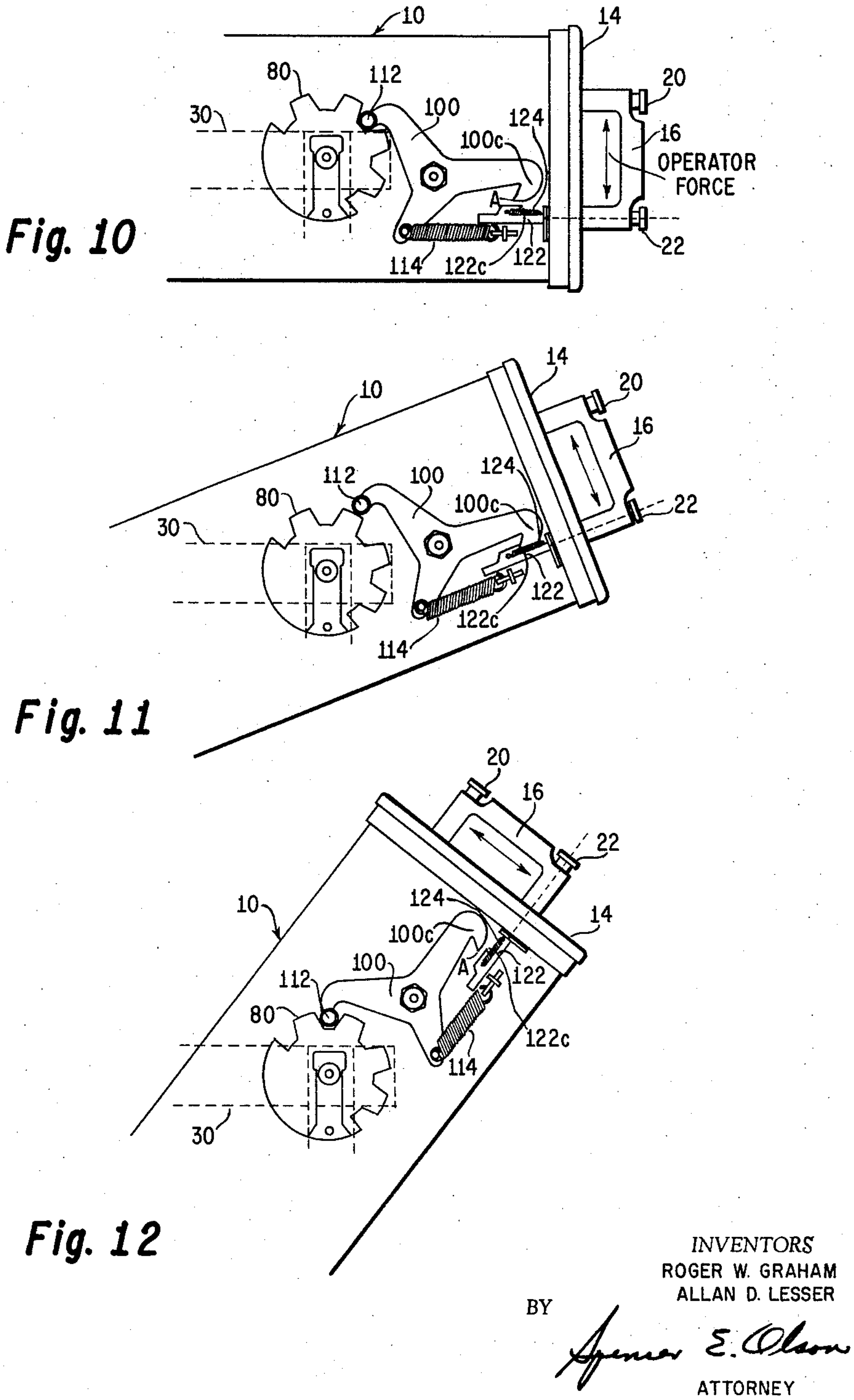
FIGS. 10, 11 and 12 are diagrammatic views of a chassis in three different positions, useful in explaining the operation of the detent mechanism of FIG. 5.

Referring now to FIGS. 10, 11 and 12, when it is desired to rotate the chassis from one indexed position to another, the operator depresses the buttons 22 on the front panel to move latch bar 122 to the left, thereby removing the interference between the latch bar and the end 100*c* of the crank arm to allow limited rotation of the crank arm and the roller 112 to be cammed out of a notch in the detent block 80 when rotational force is applied to the front panel handles. The end 100*c* of the crank arm is formed with a hook which engages a similarly inclined surface 122*c* of the latch bar when the crank 100 is rotated in a clockwise direction as viewed in FIG. 11. This cooperation between the crank and the latch bar insures that the latch bar is held in so long as the detent roller is riding on the circumference of the detent block 80 even if the force on button 22 is removed. This feature allows an interlock to be used between the detenting pushbuttons 22 and the slide lock pushbuttons 20 to prevent damage to the slide lock linkages while rotating the chassis on the extended slides. A suitable interlock arrangement will be described hereinbelow. When the chassis is rotated sufficiently for the roller 112 to reach the next notch in detent block 80, (FIG. 12), the torque on crank arm 100 due to spring 114 forces the roller to snap into the notch. When this occurs, the hook disengages from surface 122*c* of the latch bar, allowing the latter to be returned by spring 124 to its normal position, and the chassis is then locked in the position shown in FIG. 12. In the illustrated embodiment, the detent block has five equally spaced notches, the central notch being located to index the chassis in a horizontal position (FIG. 10), the two extreme notches being located to index the chassis in two vertical positions, with the remaining two notches serving to position the chassis at two intermediate angles of tilt, one of which is shown in FIG. 12.

Figure 9:
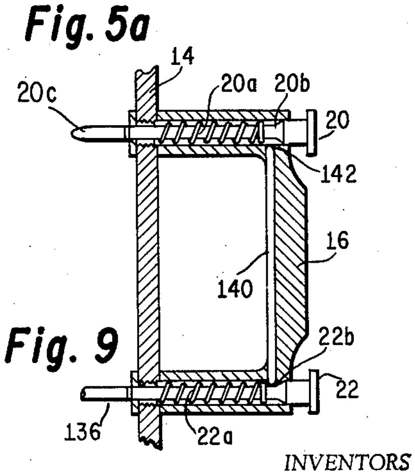
FIG. 9 is an enlarged elevation cross-section view taken along line 9—9 of FIG. 1 and illustrating the interlock feature of the invention.

FIG. 9 is a cross-section of handle 16 illustrating an interlock for the pushbuttons 20 and 22. As shown, buttons 20 and 22 are respectively at the extremities of shafts 20*c* and 136 which extend through the front panel 14, and are normally urged to the right by compression springs 20*a* and 22*a*, respectively. In the vicinity of the buttons the shafts change in diameter to provide inclined surfaces 20*b* and 22*b* on the respective shafts. A slender rod 140 is arranged to slide freely up and down in a bore 142 in handle 16. The rod is of a length that when it is in the "down" position shown, the upper end is clear of the bore for button 20. When button 22 is depressed, the lower end of rod 140 rides up on inclined plane 22*b* and forces the upper end into engagement with shaft 20*c* at the base of inclined plane 20*b*. Thus, when either of buttons 20 or 22 is depressed, the rod 140 precludes depression of the other one. As was mentioned earlier, button 22 is kept in so long as the detent roller is riding on the circumference of detent block 82; the interlock prevents depression of button 20 and possible damage to rods 52 and 46 during rotation of the chassis.

From the foregoing it is seen that it is necessary only to overcome the light force of spring 124 to release the detent mechanism to permit rotation of the chassis to a new indexed position. That is, the pushbuttons on the front panel are not directly connected to the detent mechanism, and the holding force of spring 114 need not be overcome by the pushbutton. Rather, the detent roller is disengaged from a notch by rotational force applied to the handles by the hands and arms of the operator which rolls the cam follower 112 out of the notch against the restoring force of spring 114. The energy stored in spring 114 automatically snaps the roller into the next successive notch as the chassis is tilted, and even if the release button should be depressed, the operator will necessarily have a grip on the handles thereby precluding inadvertent rotation of the chassis through an angle greater than the angular spacing between successive notches.

The mounting of all of the components of the detent mechanism, including the block 80, on the subassembly mounting plate 70 provides a very compact assembly and permits the use of close tolerances, particularly in the chassis pivot point, without sacrificing ease of removal of the chassis from the slides. The modular subassembly design also simplifies the linking of the detent mechanism to the pushbuttons on the front panel of the chassis. By virtue of the plate 70 subassembly, the entire detent mechanism, and the support for the slide lock extender rod, are compactly secured to the chassis, with only the plate 92 and the support 48 for rod 46 supported on the outermost slide member 30. With this arrangement, there is no need for slide member 30 to extend appreciably beyond the pivot point 78. Consequently, the end of slide 30 never projects beyond the chassis, regardless of the tilted position of the chassis, a feature of considerable importance to the safety of personnel working with or walking past the equipment.

While a preferred embodiment of the invention has been shown and described, it will be apparent that numerous variations and modifications thereof may be made without departing from the underlying principles and scope of the invention. For example, although not as satisfactory it may be possible in some installations to eliminate roller 112 and instead shape the end 100*a* of the crank arm to follow the detent block. Also, it is within the contemplation of the invention to employ a torsion spring on crank arm 100 instead of the illustrated tension spring 114. It is therefore intended, by the following claims, to include all such variations and modifications by which substantially the results of the invention may be obtained through the use of substantially the same or equivalent means.

What is claimed is:

1. In cabinet installed equipment including a cabinet, a pair of extensible track assemblies mounted on opposite side walls of the cabinet, and a chassis having a front panel and a pair of side walls, pivotal support means for mounting the chassis on the track assemblies for tilting movement thereon comprising, a pair of studs projecting from opposite side walls of said chassis, a notched detent block mounted on each of said studs for rotation relative thereto, means releasably securing said detent blocks to respective ones of said track assemblies, a crank pivotally mounted on each of the side walls of said chassis and shaped at one end thereof for coaction with said detent block, spring means arranged to normally urge said one end of said crank into engagement with a notch in said detent block, a releasable latch mounted on each of the side walls of said chassis for coaction with a respective crank normally to limit rotation of the crank to an amount insufficient to allow disengagement of said one end thereof from a notch, and means accessible from said front panel for releasing said latch.

2. In cabinet installed equipment including a cabinet, a pair of extensible track assemblies mounted on opposite side walls of the cabinet, and a chassis having a front panel and a pair of side walls, pivotal support means for mounting the chassis on the track assemblies for tilting movement thereon comprising, a pair of studs projecting from opposite side walls of said chassis near the center of gravity thereof, a circular notched detent block mounted on each of said studs for rotation relative thereto, means releasably securing said detent blocks to respective ones of said track assemblies near the outer end thereof, a crank pivotally mounted on each of the side walls of said chassis between said stud and said front panel and having a cam at one end thereof shaped for coaction with the notches in said detent block, spring means arranged to normally urge said cam into engagement with a notch in said detent block with sufficient force to maintain said chassis at any angle of tilt as determined by the notch engaged, a releasable latch mounted on each of the side walls of said chassis for coaction with a respective crank normally to limit rotation of the crank to an amount insufficient to allow disengagement of said cam from a notch, and means accessible from said front panel for releasing said latch.

3. In cabinet installed equipment including a cabinet, a pair of extensible track assemblies mounted on opposite side walls of the cabinet, and a chassis having a front panel and a pair of side walls, pivotal support means for mounting the chassis on the track assemblies for tilting movement thereon comprising, a pair of studs projecting from opposite side walls of said chassis near the center of gravity thereof, a flat circular detent block mounted on each of said studs for rotation relative thereto, said blocks each having a plurality of notches spaced about at least a portion of its periphery, and a groove in the surface thereof remote from the chassis, a plate secured to each of said track assemblies removably received in the groove in a respective one of said detent blocks, a crank pivotally mounted on each of the side walls of said chassis, a cam follower mounted on one end of said crank for coaction with said detent block, first spring means anchored to said chassis and secured to said crank normally urging rotation of said crank in a first direction to force said cam follower into engagement with the periphery of said block, a releasable latch mounted on each side wall of said chassis for motion with clearance relative to another end of a respective crank when said cam is in engagement with a notch, second spring means normally lightly urging said latch to a position relative to said other end of said crank to limit rotation of the crank in a direction opposite to said first direction to the amount of said clearance, said clearance being insufficient to allow disengagement of said cam follower from a notch, and means accessible from said front panel for moving said latch against the restoring force of said second spring means to a second position to allow said crank to rotate in said opposite direction sufficient to allow said cam follower to cam out of a notch and onto the periphery of said block.

4. In cabinet installed equipment including a cabinet, a pair of extensible track assemblies mounted on opposite side walls of the cabinet, and a chassis having a front panel and a pair of side walls, pivotal support means for mounting the chassis on the track assemblies for tilting movement thereon comprising, a pair of studs projecting from opposite side walls of said chassis near the center of gravity thereof, a flat circular detent block mounted on each of said studs for rotation relative thereto, said blocks each having a plurality of notches spaced about at least a portion of its periphery, and a groove in the surface thereof remote from the chassis, a plate secured to the inner surface of each of said track assemblies near the outer extremity thereof removably received in the groove in a respective one of said detent blocks, a crank pivotally mounted on each of the side walls of said chassis between said stud and said front panel, a cam follower mounted on one end of said crank for coaction with said detent block, first spring means anchored to said chassis and secured to said crank normally urging rotation of said crank in a first direction to force said cam follower into engagement with the periphery of said block with sufficient force to maintain said chassis at any angle of tilt as determined by which notch is engaged by said cam follower, a releasable latch mounted on each side wall of said chassis for sliding motion with clearance relative to another end of a respective crank when said cam is in engagement with a notch, second spring means normally lightly urging said latch to a position relative to said other end of said crank to limit rotation of the crank in a direction opposite to said first direction to the amount of said clearance, said clearance being insufficient to allow disengagement of said cam follower from a notch, and means accessible from said front panel for sliding said latch against the restoring force of said second spring means to a second position in which said crank is allowed to rotate in said opposite direction sufficient to allow said cam follower to cam out of a notch and onto the periphery of said block.

5. Apparatus in accordance with claim 4 wherein said other end of said crank is shaped to coact with said latch to retain said latch in said second position so long as said cam follower engages the periphery of said block and to allow said latch to return to its normal position when said cam follower is forced into a notch by said first spring means.

6. Apparatus in accordance with claim 4 wherein said stud, said crank, said latch, and said first and second spring means are assembled on a mounting plate, and means for securing said mounting plate on the side wall of said chassis.

7. In cabinet installed equipment including a cabinet, a pair of extensible track assemblies mounted on opposite side walls of the cabinet, and a chassis having a front panel and a pair of side walls, pivotal support means for mounting the chassis on the track assemblies for tilting movement thereon comprising, a pair of studs projecting from opposite side walls of said chassis near the center of gravity thereof, a flat circular detent block mounted on each of said studs for rotation relative thereto, said blocks each having a plurality of notches spaced about at least a portion of its periphery, and formed with a groove in the surface thereof remote from the chassis, a plate secured to the inner surface of each of said track assemblies near the outer end thereof removably received in the groove in a respective one of said detent blocks, a three-armed crank pivotally mounted on each of the side walls of said chassis between said stud and said front panel and disposed in substantially the plane of said detent block, a rolling cam follower mounted on the end of a first of the arms of said crank for coaction with said detent block, first spring means anchored to said chassis and secured to a second arm of said crank and normally urging rotation of said crank in a first direction to force said cam follower into engagement with said detent block, a releasable latch mounted on each side wall of said chassis for sliding motion with clearance relative to the third arm of a respective crank when the cam follower is in engagement with a notch in said detent block, second spring means normally lightly urging said latch to a position relative to said third arm of the crank to limit rotation of the crank in a direction opposite to said first direction to the amount of said clearance, said clearance being insufficient to allow disengagement of said cam follower from a notch in said block, and means accessible from said front panel for sliding said latch against the restoring force of said second spring means to a second position in which said crank is allowed to rotate in said opposite direction by an amount sufficient to allow said cam follower to roll out of a notch and onto the periphery of said block.

8. In cabinet installed equipment including a cabinet, a pair of extensible track assemblies mounted on opposite side walls of the cabinet, and a chassis having a front panel and a pair of side walls, pivotal support means for mounting the chassis on the track assemblies for tilting movement thereon comprising, studs projecting from opposite side walls of said chassis, a notched detent block mounted for relative rotation on each of said studs and removably secured to a respective track assembly, linkage mechanism mounted on the side walls of said chassis and including a cam arranged for coaction with said detent block and a spring normally urging said cam into engagement with said block with a force sufficient to maintain said chassis at any of a plurality of angles of tilt determined by which notch is engaged by said cam, latch means supported on the side walls of said chassis and arranged to prevent disengagement of said cam from a notch upon inadvertent application of a rotational force to said chassis in excess of the holding force of said spring, and means accessible from the front panel of said chassis for releasing said latch means.

References Cited in the file of this patent

UNITED STATES PATENTS

| | | |
|---|---|---|
| 2,510,681 | Campbell et al. | June 6, 1950 |
| 2,655,422 | Gussack | Oct. 13, 1953 |
| 2,788,253 | Gussack | Apr. 9, 1957 |
| 2,809,085 | Fall | Oct. 8, 1957 |
| 2,856,450 | Padgett et al. | Oct. 14, 1958 |